US006139001A

United States Patent [19]

Buck

[11] Patent Number: 6,139,001

[45] Date of Patent: Oct. 31, 2000

[54] JAW ASSEMBLY FOR WORKHOLDING APPARATUS

[76] Inventor: James R. Buck, 1207 SE. 10th St., Cape Coral, Fla. 33904

[21] Appl. No.: 09/149,187

[22] Filed: Sep. 8, 1998

[51] Int. Cl.[7] .................................................. B23Q 3/02

[52] U.S. Cl. .................................................. 269/136; 267/43

[58] Field of Search .................................................. 269/136, 43, 279, 269/280, 283, 152, 154

[56] References Cited

U.S. PATENT DOCUMENTS 5,649,694 7/1997 Buck .................................................. 269/43

5,720,476 2/1998 Swann et al. .................................................. 269/136

OTHER PUBLICATIONS

Brochure/Flyer of Dapra Corporation entitled "Introducing Dapra's Cost–Effective NC Vise."

*Primary Examiner*—David A. Scherbel
*Assistant Examiner*—Daniel G. Shanley
*Attorney, Agent, or Firm*—Flynn, Thiel, Boutell & Tanis, P.C.

[57] ABSTRACT

A workholding apparatus includes a top jaw member and a bottom master jaw element. The master jaw element is movably supported on a base member and has a keypart fixed thereto and projecting upwardly. The keypart receives the top jaw member. An aperture of the top jaw member having closed ends, and an open mouth surrounded by vertical walls, fits over the keypart of the top jaw member. The keypart can have a cross-section having portions resembling a double dovetail configuration. The aperture of the top jaw member has similar dovetail-shaped sections to receive the keypart. The keypart includes a takeup member having an arcuate keeper element secured and projecting from a surface of the keypart opposite the dovetail-shaped portions. The keeper element projects outwardly a small distance to seat on an inclined surface of the aperture very close to the vertical walls thereof. Thus the top member preferably is contacted by the keeper element at a location on the inclined surface within about 0.100 inch, and more preferably 0.060 inch from the mouth of the aperture.

19 Claims, 8 Drawing Sheets

JAW ASSEMBLY FOR WORKHOLDING APPARATUS

FIELD OF THE INVENTION

This invention relates to a workholding apparatus for clamping a workpiece, which apparatus is commonly known as a vise, and particularly relates to an improved jaw assembly that provides improved securement of a top jaw member to a master jaw element.

BACKGROUND OF THE INVENTION

It is common practice to utilize a vise for securing a workpiece when performing work on the workpiece. Such vises are typically utilized on precision machining equipment, such as numeric-control equipment, to clampingly hold a workpiece during a defined machining operation. Such vises typically employ a pair of moving jaw members to hold a workpiece at a working station to perform machining operations thereon. The known vises typically mount the jaw members to keyparts of master jaw elements. The jaw members typically have a connecting passage open on at least one side to enable the respective top to be positioned onto the keypart of the master jaw element by sliding in a direction transverse to the direction of movement of the master jaw element when opening or closing the vise.

One drawback from having an open end or ends on the jaw member is that, during application of a load onto the jaw member, the jaw member can bulge or become uneven due to slight deformation of the metal jaw member at the open end or ends thereof. Further, closing the ends of the metal jaw member prevents turnings or other scrap metal from entering the connecting passageway of the top jaw member.

Accordingly, it is an object of this invention to provide an improved jaw assembly for enabling secure clamping of a workpiece, such as for permitting machining or other manipulations to be carried out with respect to the workpiece, which jaw assembly provides improvements with respect to performance of a vise by closing the ends of the top jaw member being mounted to the master jaw element.

Another preferred object of the invention is to provide an improved jaw assembly which incorporates into the cross section of the top jaw member two dovetail sections. The top jaw member has the same amount of corresponding inclined contact surface for a given depth of the connecting passage while having a substantially smaller width than a corresponding single dovetail jaw member. Of course, the master jaw element must have a keypart projecting upwardly that is designed to fit the jaw member.

Another preferred object of the invention is to provide an improved jaw assembly which includes a master jaw element having a keypart. The improved keypart has a dovetail-shaped portion on one side and a takeup member on the other side thereof. The takeup member has a keeper element extending outwardly therefrom. The keypart mates with a top jaw member having a passage with outwardly inclined dovetail-shaped sections and substantially vertical walls forming a mouth connected to the dovetail-shaped sections. In use, the keeper element extends onto an inclined surface of a wall approaching the dovetail-shaped sections and within about 0.100 inch, preferably 0.060 inch from the vertical wall of the mouth.

It is a further object of the invention to limit the movement of the top jaw relative to the master jaw to the close tolerance clearance distance of about 0.020 inch between an outside facing surface on the master jaw and the immediately adjacent opposing jaw surface.

SUMMARY OF THE INVENTION

A moving jaw assembly of the invention for a workholding apparatus, in a preferred embodiment, has a master jaw element which is movably slidably supported on a base member of the workholding apparatus. The master jaw element has a first keypart fixed thereto projecting upwardly, the first keypart having a dovetail-shaped cross section on at least one side corresponding to the inward facing side of the workholding apparatus. A top jaw member includes a pair of flat and coplanar bottom surfaces disposed adjacent opposite ends thereof and separated by an elongate second keypart which is disposed on the master jaw element and a base member. The top jaw member has a connecting passage formed in and extending transversely through at least a portion thereof from one end to the other end in perpendicular relation to the elongate second keypart of the top jaw member, the connecting passage having a dovetail-shaped cross-section which converges to a mouth, the dovetail-shaped cross-section corresponding to, but being slightly larger than the first dovetail-shaped cross section of the master jaw element, the connecting passage being closed on both ends to form an aperture having the dovetail-shaped cross-section such that, during set up of the jaw assembly, the top jaw member is placed over the keypart of the master jaw element and secured thereto.

In the jaw assembly of the invention, a takeup member movably mounted on the first keypart of the master jaw element and urged outwardly for engagement with one inclined side surface of the aperture of the top jaw member eliminates clearance adjacent the inclined side surface of the aperture and causes the top jaw member to snug down against a base member and the master jaw element.

In some embodiments, the takeup member extends upwardly into contact with the side surface of the aperture at an upward angle from about 5 degrees to about 45 degrees from horizontal.

In the jaw assembly of the invention, the takeup member contacting the side surface of the aperture comprises an arcuate keeper element, the side surface of the aperture including a notch to enable the arcuate keeper element to reach a secured position with less resistance.

In most embodiments, the keeper element comprises a plunger biased outwardly into contact with an inclined surface in the aperture by a spring.

In some embodiments, the takeup member comprises a resilient takeup device mounted on the first keypart and engaging an inclined side surface of the aperture at a location within about 0.060 inch from the mouth of the aperture, the mouth of the aperture comprising substantially vertical walls extending upwardly to the inclined side surface thereof.

In the jaw assembly of the invention, the first keypart has a gap of no more than about 0.020 inch with respect to the aperture of the top jaw member at least between an outside facing surface of the master jaw and the opposed top jaw surface in a direction perpendicular to the length of the jaw assembly during and after placement thereon, the gap thus being sized to prevent turnings or metal chips from entering the top jaw member through the gap and interfering with operation of the jaw assembly.

In some embodiments, the dovetail-shaped cross section of the first keypart includes a second dovetail-shaped cross section above the first dovetail-shaped cross section and the dovetail-shaped cross section of the aperture includes a corresponding second dovetail-shaped cross section, the two dovetail-shaped cross sections of the aperture having substantially the same surface area as compared to an aperture having a single dovetail-shaped cross section for an equivalent aperture depth.

BRIEF DESCRIPTION OF THE DRAWINGS

Other objects and purposes of the invention will be apparent to persons familiar with vises of this general type upon reading the following specification and inspecting the accompanying drawings, in which.

Figure 1:
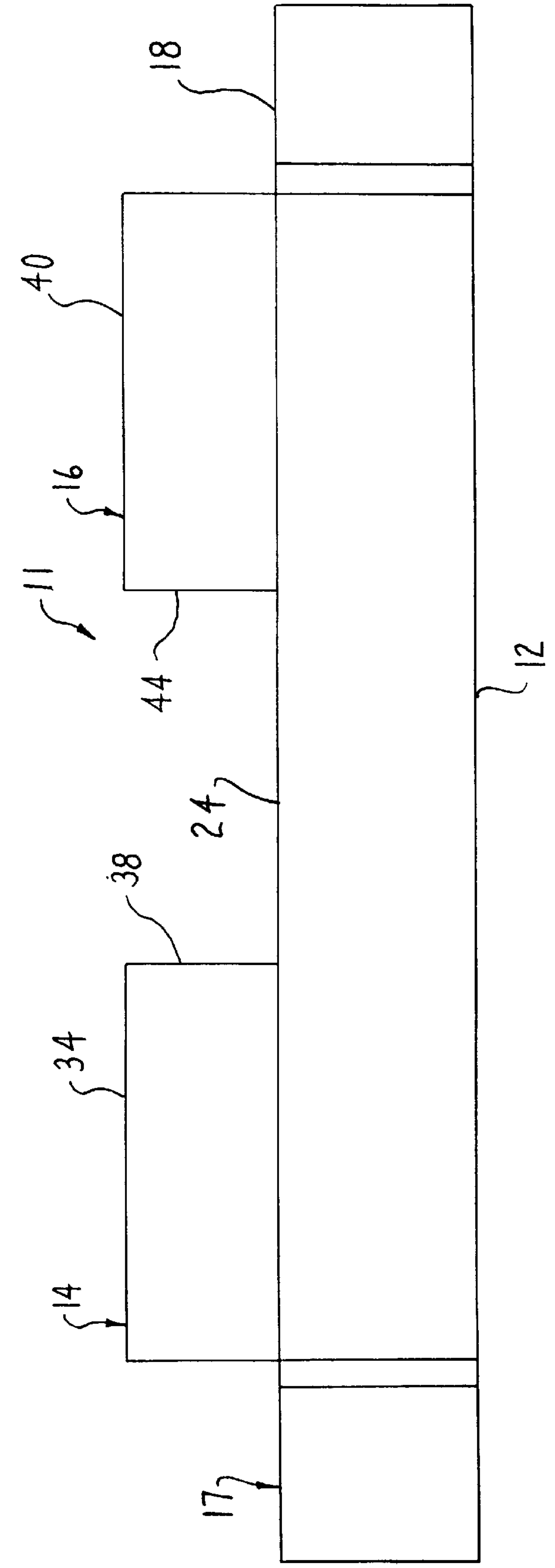
FIG. 1 is a side elevational view of an improved workholding device according to the present invention.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the vise and designated parts thereof. With respect to the top jaw members, ends of the jaw members are on opposing sides of the workholding apparatus. Thus the orientation for the description of the top jaw member differs from the orientation in the description of the master jaw elements and base member. Such terminology will include the words specifically mentioned, derivatives thereof, and words of similar import.

DETAILED DESCRIPTION

Figure 2:
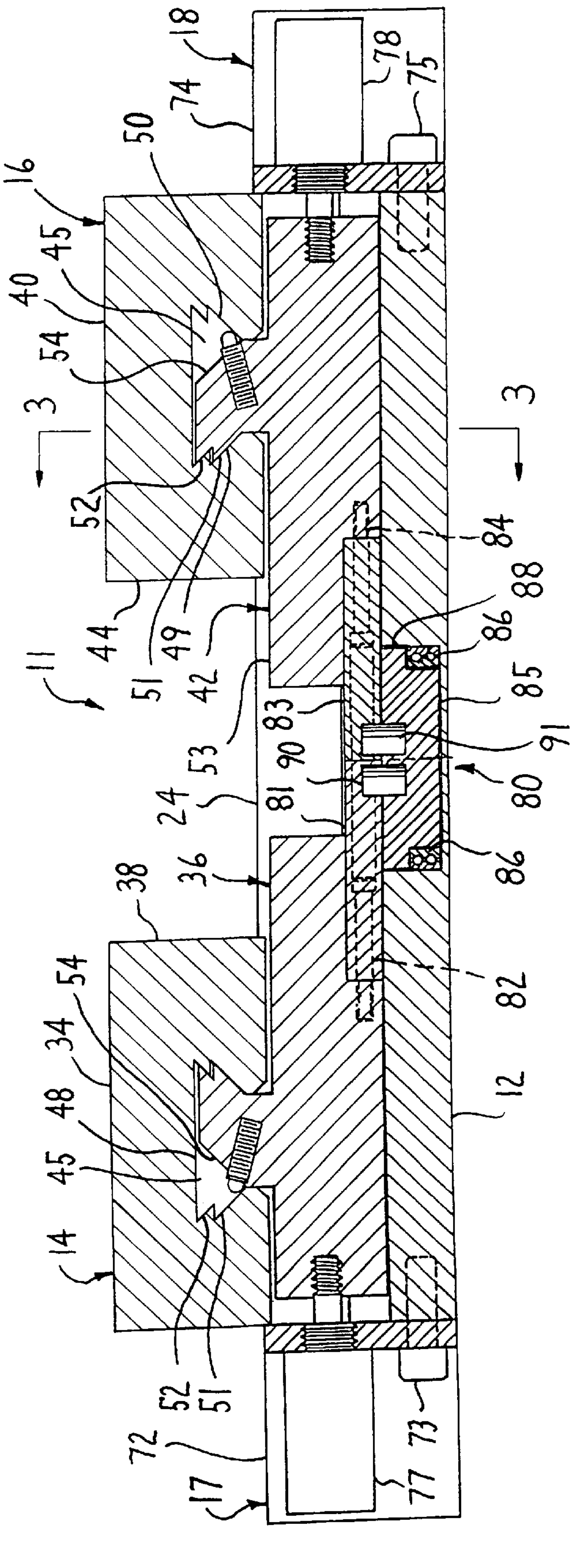
FIG. 2 is a longitudinally extending sectional view taken through as a cut of the view of FIG. 1.

Referring to the drawings and specifically FIGS. 1–10, there is illustrated a workholding device 11, such as a vise, according to the present invention. This workholding device 11 includes a base member 12, a first left movable jaw assembly 14, and a second right movable jaw assembly 16. A first actuator assembly 17 and a second actuator assembly 18 are associated with respective longitudinal ends of the workholding device 11 for actuating, respectively, the left and right jaw assemblies 14 and 16 as shown in FIG. 2.

Figure 3:
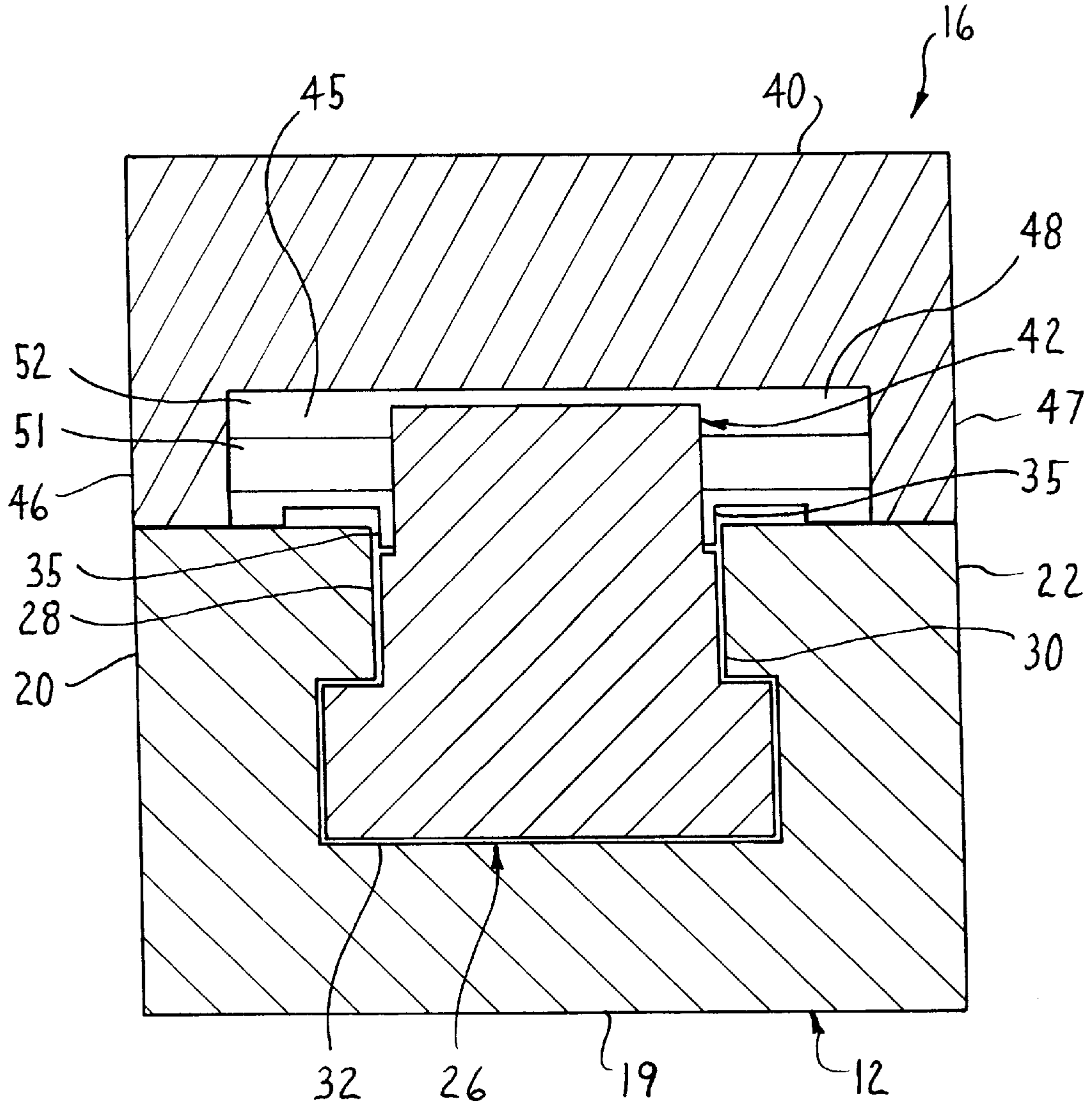
FIG. 3 is a cross-sectional view taken generally along line 3—3 in FIG. 2.

Base member 12 includes an elongate U-shaped support block 19 having upwardly projecting side legs 20, 22, as shown in FIG. 3, which at upper ends thereof can have elongate ways or guide elements fixed thereto, the latter defining upper horizontally elongated slide surfaces 24 thereon. Base member 12 defines therein a longitudinally elongated and upwardly opening guide passage 26, the latter being of a generally inverted T-shaped cross section and opening upwardly between the parallel side legs 20, 22. The guide passage defines thereon opposed guide surfaces 28, 30 which define opposite sides of the upper portion of guide passage 26. The bottom of guide passage 26 is defined by a bottom guide surface 32 formed on base member 12 as shown in FIG. 3.

Considering now the structure of the left movable jaw assembly 14, it includes a bottom or master jaw element 36, shown in FIG. 2, which is slidably supported generally within the inverted T-shaped guide passage 26, and this bottom jaw element in turn removably mounts thereon a top jaw member 34. A keypart 35 of top jaw member 34, shown in FIG. 3, retains the jaw member in sliding engagement with side legs 20, 22 of base member 12. Thus keypart 35 prevents movement of top jaw member 34 in a direction transverse to the length of base member 12. Top jaw member 34 defines thereon a jaw gripping surface 38 at an inner side thereof.

Right movable jaw assembly 16 can include a right top jaw member 40 and a right bottom jaw element 42. Right top jaw member 40 can include an opposing gripping surface 44 contoured identically to gripping surface 38. Right top jaw member 40 includes a keypart similar to keypart 35 except oriented in the reverse direction.

While these gripping surfaces 38 and 44 are illustrated as planar in FIGS. 1 and 2, it will be appreciated that this is solely for convenience in illustration, and that the gripping surfaces may be provided with whatever contour is desired so as to generally correspond with the configuration of the workpiece surface being gripped. The gripping surfaces can additionally be provided on separate removable jaw plates which attach to the respective top jaw members 34, 40 if desired. Top jaw members 34, 40 are positioned to extend above base member 12 and to extend transversely across the base member. Adjacent opposite ends of top jaw members 34, 40 are provided with generally coplanar bottom surfaces which are slidably supported on upper surfaces 24 of legs 20, 22 for movement along the length of workholding device 11.

Figure 4:
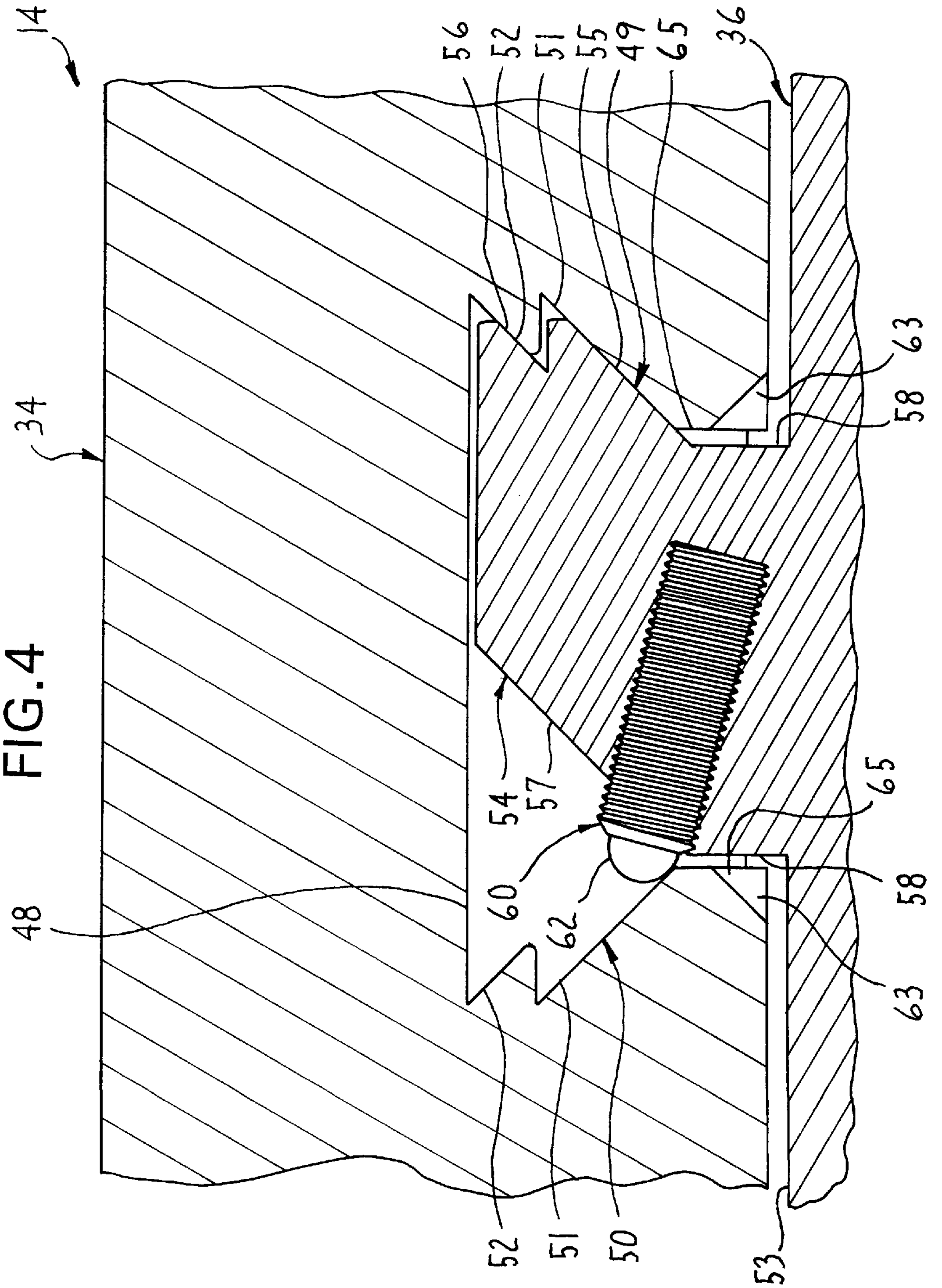
FIG. 4 is a close-up view of a section of FIG. 2 showing a keypart.

Top jaw member 34 defines therein a guideway or connecting passage 45 which is elongated transversely thereacross, and which opens outwardly through both the bottom of the top jaw member 34 and generally does not open outwardly through end surfaces thereof. As shown in FIG. 3, end walls 46, 47 close both ends of passage 45 to form an aperture 48. Aperture 48 seats top jaw member as will be described in detail later. Aperture 48 has a generally double dovetail-shaped cross section as defined between opposed side walls 49 and 50 that project upwardly from the bottom of top jaw member 34 and which not only diverge with respect to one another, but also diverge away from the vertical in stepped fashion, preferably at an angle of about 45° as shown in FIGS. 2 and 4. These diverging side walls 49 and 50 in turn are joined by a generally horizontally extending top wall that defines the closed ends of aperture 48. Side walls 49, 50 of top jaw members 34, 40 have first and second dovetail sections 51, 52. The first dovetail section 51 is located below dovetail section 52 as shown in FIG. 4. Both dovetails preferably have approximately the same width as illustrated in FIG. 4.

As to the master or bottom jaw elements 36, 42, they include a base part 53 that is elongated in the longitudinal direction of the base structure and has a generally inverted T-shaped cross section so as to be snugly but longitudinally slidably disposed within the inverted T-shaped guide passage 26. This elongate base part 53 in turn has a keypart 54 formed integrally thereon and projecting upwardly at the upper end thereof, this keypart 54 having a cross-section including first and second generally dovetail-shaped portions 55, 56 on one end when viewed in a vertical longitudinal plane.

As best illustrated in FIG. 4, the first and second dovetail portions 55, 56 of bottom master jaw element 42 are in surface-to-surface contact with mating sections 51, 52 of aperture 48 of top jaw member 34. Further, FIG. 4 shows the end of keypart 54 of bottom master jaw element 36 having a surface 57 defining an open section, the surface being inclined inwardly from substantially vertically upward walls 58 extending upwardly from base part 53. By having surface 57 inclined inwardly, keypart 54 is able to fit within aperture 48. This is necessary because the closed end walls 46, 47 of top jaw member 34 do not allow the top jaw member to be slid onto keypart 54 from a direction transverse to the direction of movement of the jaw assembly 14. The inwardly inclined surface 57 of keypart 54 provides room enabling mounting of top jaw member 34 on base member 12 and master jaw element 36.

The first and second dovetail sections 51, 52 improve the ability to mount the top jaw member 34. As shown in FIG. 4, the two dovetails enable about the same amount of surface area of dovetail portions 55, 56 to contact the top jaw member as in a single dovetail arrangement. Further, the width at the top of aperture 48 from side wall 49 to sidewall 50 need not be as great because of the double dovetail arrangement. This is so because, for a given depth and a given incline for side walls 49, 50, the width at the top of aperture 48 would have to be greater but for the second dovetail section 52 entering into the aperture. The arrangement of the invention provides an improved mounting contact surface without requiring as much machine tooling in making aperture 48. Further, the first and second dovetail portions 55 and 56 on the master jaw 42 assure, when mated with top jaw surfaces 51 and 52, a parallel drawing together of the top jaw and master jaw.

Takeup member 60 mounted to keypart 54 provides securement of top jaw member 34 to master jaw element 36 after placement thereon. Takeup member 60 includes an outwardly biased keeper element 62 supporting the top jaw member 34 on the master jaw element 36 and base member 12 by contacting an outwardly inclined portion of first dovetail section 51 of aperture 48.

Takeup member 60 preferably is mounted at an upward angle of between about 5 degrees and 45 degrees, more preferably at an upward angle of between about 10 degrees and 20 degrees, and most preferably at about 15 degrees with respect to the horizontal (assuming the workholding device 11 will be used on a level surface). Such an angle, in combination with notch element 63 found at portion of a substantially vertical wall 65 forming a mouth for aperture 48, assists in improving securement of the elements.

Notch element 63 is sized and shaped to receive keeper element 62. Thus, notch element 63 assists a user in aligning keeper element 62 in the proper position for mounting the parts of the workholding device 11.

Further, the angle between the horizontal and takeup member 60 has the effect of improving or decreasing the contact distance of keeper element on the side wall 50 of aperture 48 from vertical wall 65 of the aperture. This distance must remain small, no more than about 0.10 inch, and preferably no more than about 0.060 inch for the invention to function best. These tolerances are required so that top jaw members 34, 40 seat properly and can be properly removed and replaced.

The tolerances for gaps between upward walls 58 of keypart 54 and vertical walls 65 of aperture 48 are also extremely close, preferably on the order of about 0.020 inch. Such a small tolerance between the walls of the members creates gaps so small that turnings or metal chips from machine tooling of workpieces will not enter the top jaw member 34 through the gaps interfering with operation of the workholding device 11. For example, turnings or metal chips could jam top jaw member 34 and prevent removal from keypart 54 of master jaw element 36. Further, relative movement between the master jaw and top jaw is limited to the aforesaid clearance of 0.020 inch between the left vertical wall 65 (FIG. 4) on the top jaw and the immediate outside facing surface 58 on the master jaw, namely, the surface on each master jaw adjacent the takeup member 60, the surface 58 facing in a direction perpendicular to the length of the top jaw.

Figure 6:
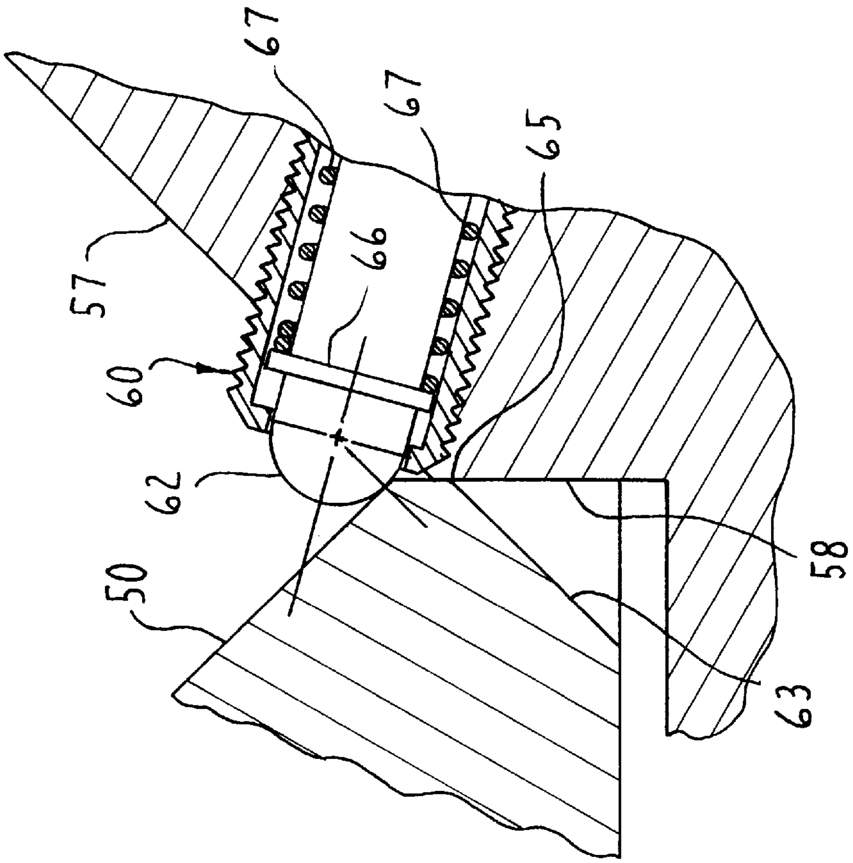
FIG. 6 shows a view similar to the view of FIG. 5 except that the gap between the keypart wall and the aperture wall has been decreased.
Figure 5:
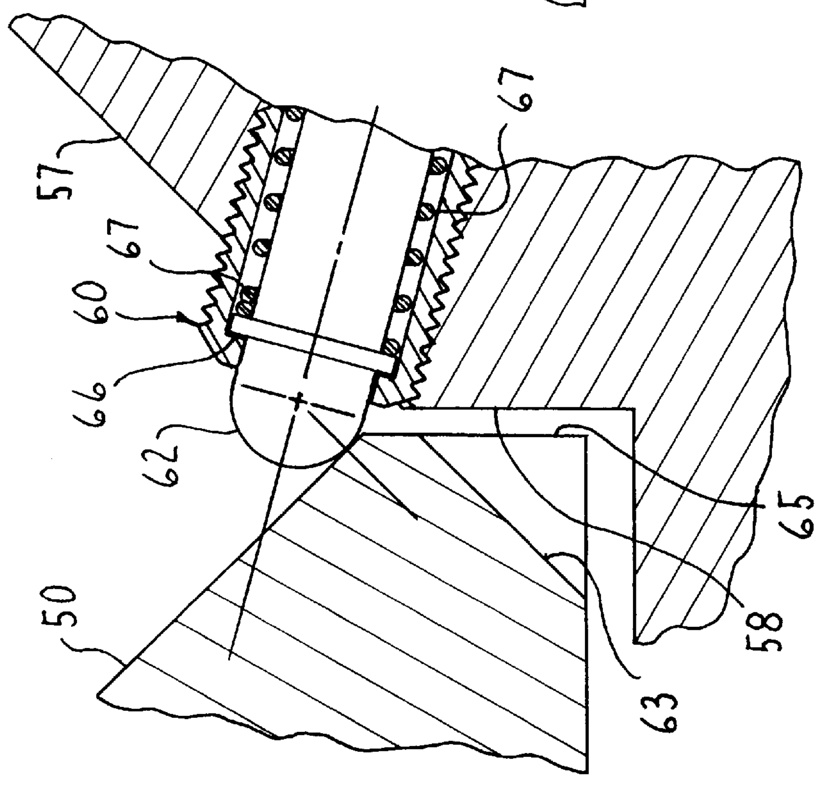
FIG. 5 is a close up view of the view of FIG. 4 having a cut through the takeup element showing the spring mounted therein.

FIGS. 5 and 6 illustrate various tolerances for upward walls 58 of keypart 54 of the master jaw element with respect to vertical wall 65 of the aperture. Notch element or cut-out 65, as better shown in FIGS. 9 and 10, has no effect on the overall clearance between the elements.

In FIG. 5, a relatively large gap or clearance is shown between vertical wall 65 and upward wall 58. Keeper element 62 comprising a plunger extends outwardly from takeup member 60 a distance sufficient to span the gap or clearance. Keeper element 62 has a support element 66 comprising a ring fitted and fixed about a circumference of the keeper element adjacent the outwardly extended end of the keeper element. Support element 66 acts as a stop in contact with an end of wire spring 67. A spring 67 provides a force to support ring 66 that biases the end of keeper element 62 to project outwardly of takeup member 60. The other end of spring 67 (not shown) merely contacts the opposing end of takeup member 60.

FIG. 6 has essentially the same elements functioning in the same manner as in FIG. 5. However, in this embodiment, keeper element 62 does not extend out as far from takeup member 60. Thus, in the position illustrated, the contact line or point where keeper element 62 contacts the inclined side wall 50 of aperture 48 is even closer to the corner of the side wall with vertical wall 65. Further, the gap between the keypart 54 of the bottom master jaw element and the top jaw member is even smaller than the gap in FIG. 5. At any rate, the contact position of keeper element 62 is extended farther from the takeup member 60 in FIG. 5 because the keeper element 62 is extended outwardly a greater distance from the keeper element than in FIG. 6. However, as described earlier, the distance or gap between side wall 65 and upward wall 58 of the keypart is no more than about 0.020 inch.

The right movable jaw assembly 16 is substantially identical to the jaw assembly 14 described above except that the jaw assemblies 16 and 14 are basically mirror images of one another relative to the center of the vise. In all other respects, top jaw member 40 of right jaw assembly 16 can have a similar dovetail-shaped sections 51, 52, aperture 48, and bottom jaw element 42 can have a corresponding keypart 54 capable of fitting in the aperture 48 in a similar manner.

First actuator assembly 17 and second actuator assembly 18 in FIG. 1 comprise a first end support 72 and a second end support 74. As shown in FIG. 2, end support 72 is secured to base member 12 by screws 73. Likewise, second end support 74 is secured to an opposing longitudinal end of base member 12 by screws 75. First actuator assembly 17 further includes a hydraulic cylinder 77 for applying a hydraulic force to move left jaw assembly 14 inwardly toward right jaw assembly 16. Hydraulic cylinder 77 can include a piston/rod or other actuator device that moves bottom jaw element 36 inwardly in response to increased fluid pressure. Likewise, hydraulic cylinder 78 can be secured to bottom jaw element 42. In the arrangement of FIG. 2, hydraulic cylinders 77, 78 move jaw elements 36, 42 inwardly along a longitudinal path in response to fluid pressure.

FIG. 2 also shows a positioning assembly 80 including push plate elements 81, 83 mounted to respective bottom jaw elements 36, 42 by respective screws 82, 84. Push plate elements 81, 83 extend longitudinally inwardly from the bottom jaw elements and fit along slide surfaces or ways of base member 12 and/or other elements. Thus, during activation of hydraulic cylinders 77, 78, push plate elements 81, 83 can move inwardly toward one another and away from one another a predetermined distance.

As shown in FIG. 2, push plate elements 81, 83 overlie a rotary member 85 of positioning assembly 80 having race bearing 86. As shown in FIG. 2, rotary member 85 has a cylindrical shape and lies in a cylindrical bore hole 88 in base member 12. While FIG. 2 shows bore hole 88 having a closed bottom, the bottom can be partially open. In any event, rotary member 85 must be free to rotate in bore hole 88. Bearing 86, of course, assists in enabling free rotation of rotary member 85. The tolerance of rotary member 85 in bore hole 88 must be greater than normal so that the rotary member specifically controls the position of push plate elements 81, 83.

Rotary member 85 includes separate pin elements 90, 91. As shown in FIG. 2, pin elements 90, 91 are fitted in closed apertures of rotary member 85 and extend upwardly, in a direction substantially perpendicular to the longitudinal direction, and into slots provided in respective bottom surfaces of first push plate element 81 and second push plate element 83.

Push plate elements 81, 83 are spaced from each other. However, pin elements 90, 91 secured in rotary member 85 guide or control the relative positions of push plate elements 81, 83 with respect to each other. For example, as push plate elements 81, 83 close together or interlock, pin elements 90, 91 via rotation of rotary member 85, guide the plate elements positions exactly. In this manner, top jaw members 34, 40 are guided to exact positions relative to each other. This is so because of the exact relative positioning of jaw assemblies 14, 16 required by push plate elements 81, 83 and pin elements 90, 91 of rotary member 85. Therefore, the workholding device 11 can be utilized in combination with a machine tool (not shown) preferably positioned directly above rotary member 85 and over push plate elements 81, 83 to work on a workpiece fixedly held by top jaw members 34, 40.

A complete description of the operation of the above described positioning assembly 80 is set forth in U.S. patent application Ser. No. 09/149,188, filed Sep. 8, 1998, entitled TIMING DEVICE FOR WORKHOLDING APPARATUS by James R. Buck, the disclosure of which is incorporated by reference in its entirety to the extent it is not inconsistent with this application.

The various modes of operation of the workholding device 11 will now be briefly described to insure a more complete understanding of the invention. In operation, a workpiece is placed between top jaw members 34, 40. Actuator assemblies 17, 18 move top jaw members 34, 40 toward each other, securing the workpiece at gripping surfaces 38, 44. Then, a machine tool (not shown) can work on the workpiece so held. Positioning assembly 65 ensures the relative position of the workpiece does not vary despite potential errors caused by variations in the pressure applied by hydraulic cylinders 77, 78.

SECOND EMBODIMENT

Figure 7:
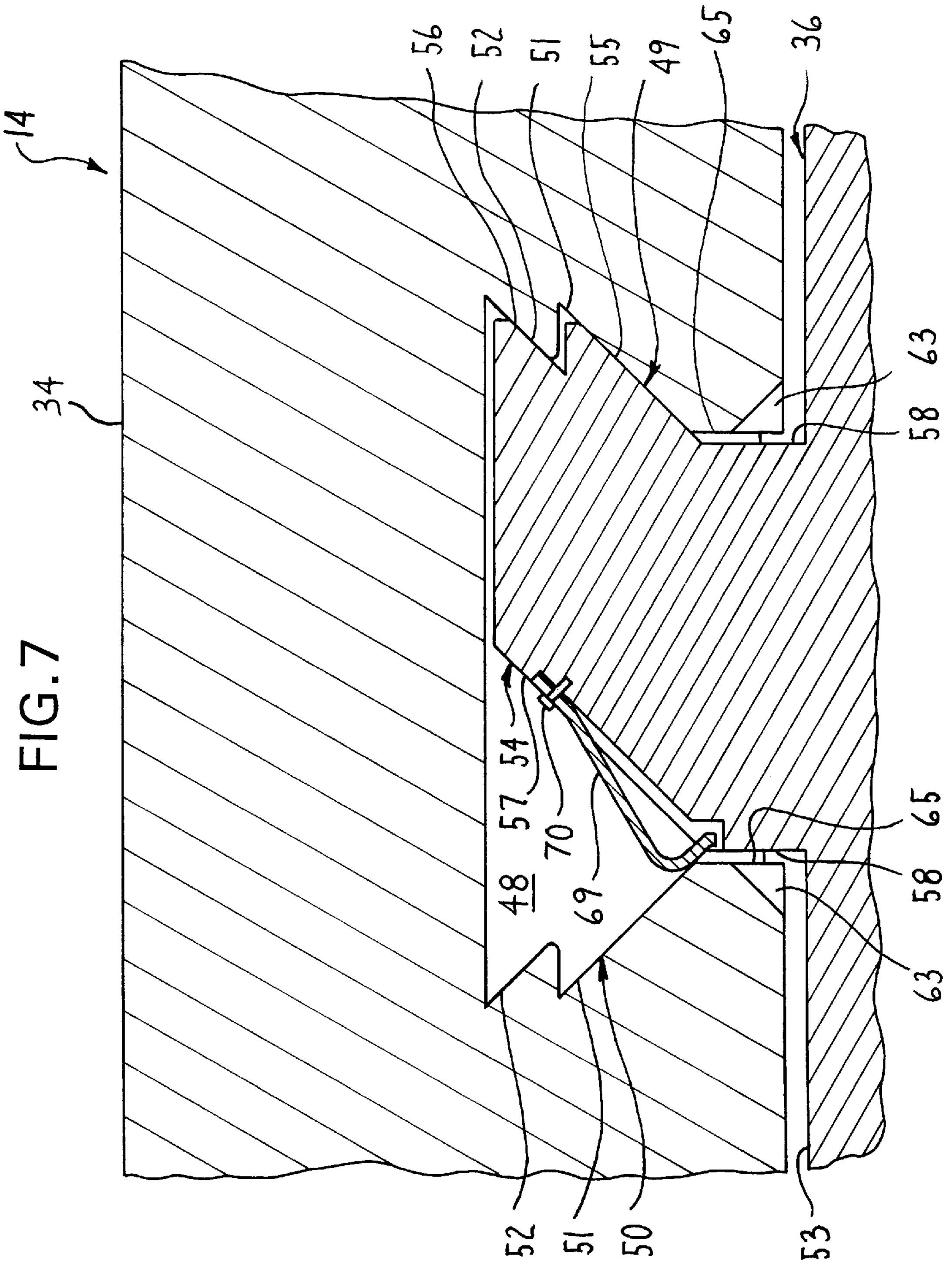
FIG. 7 shows another embodiment similar to that of FIGS. 5 or 6 except the takeup element has been replaced by a resilient take-up device.

FIG. 7 shows a second embodiment of the invention. Like elements to the embodiment illustrated in FIG. 4 have the same reference numerals. In this embodiment, takeup member 60 is replaced by a resilient takeup device 69 secured in a shoulder formed in inwardly inclined surface 57 of keypart 54 by a securing element 70. Resilient takeup device 69 generally comprises a metal spring element having a hooked or inwardly bent lower end as shown in FIG. 7. While less durable than the embodiment of FIGS. 1–6, resilient takeup device 69 does seat and secure top jaw member 34 onto bottom master jaw element 36 in an acceptable manner. Once again, resilient takeup device 69 provides satisfactory securement for a top jaw member 34 having closed ends and an aperture 48 that requires fitting over keypart 54. Just like in the earlier embodiment, top jaw member 34 is removed by an upward force pushing the projecting hooked end of the spring inwardly allowing sufficient clearance to separate the elements.

THIRD EMBODIMENT

Figure 8:
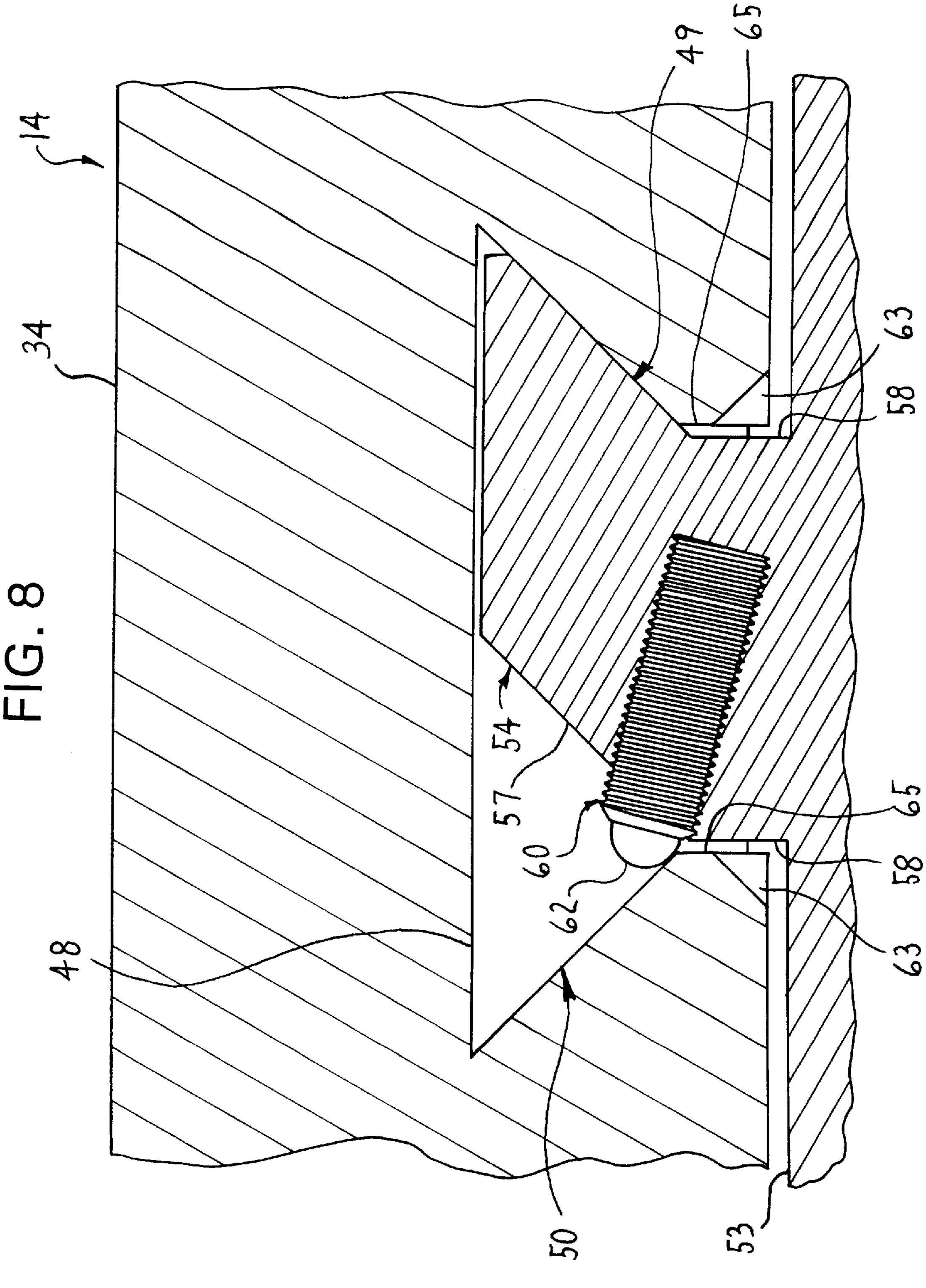
FIG. 8 shows a close up view of another embodiment of the invention similar to the view of FIG. 4 except that the outwardly inclined side wall of the keypart of the master jaw element comprises a single dovetail-shaped cross-section.

The jaw assembly embodiment illustrated in FIG. 8 is very similar in function and effect to the embodiment shown in FIG. 4. Like elements have like reference numerals. This embodiment has a more conventional dovetail arrangement. The dovetail arrangement has a single dovetail. Thus when compared to the embodiment of FIG. 4, the top surface of aperture 48 for the single dovetail has a greater width. The greater width for the dovetail also increases the outward distance of outwardly inclined side wall 49 of keypart 54. Such an arrangement makes mounting top jaw member 34 onto keypart 54 more difficult when the top jaw member has closed ends. However, the jaw assembly 14 of FIG. 8 having a single dovetail represents an enabling variation of the jaw assembly of FIG. 4. Similar dovetail-shaped sections for a top jaw member are disclosed in U.S. Pat. No. 5,649,694 issued to James Buck on Jul. 22, 1997, the disclosure of which is hereby incorporated by reference in its entirety to the extent it is consistent with this application.

Figure 9:
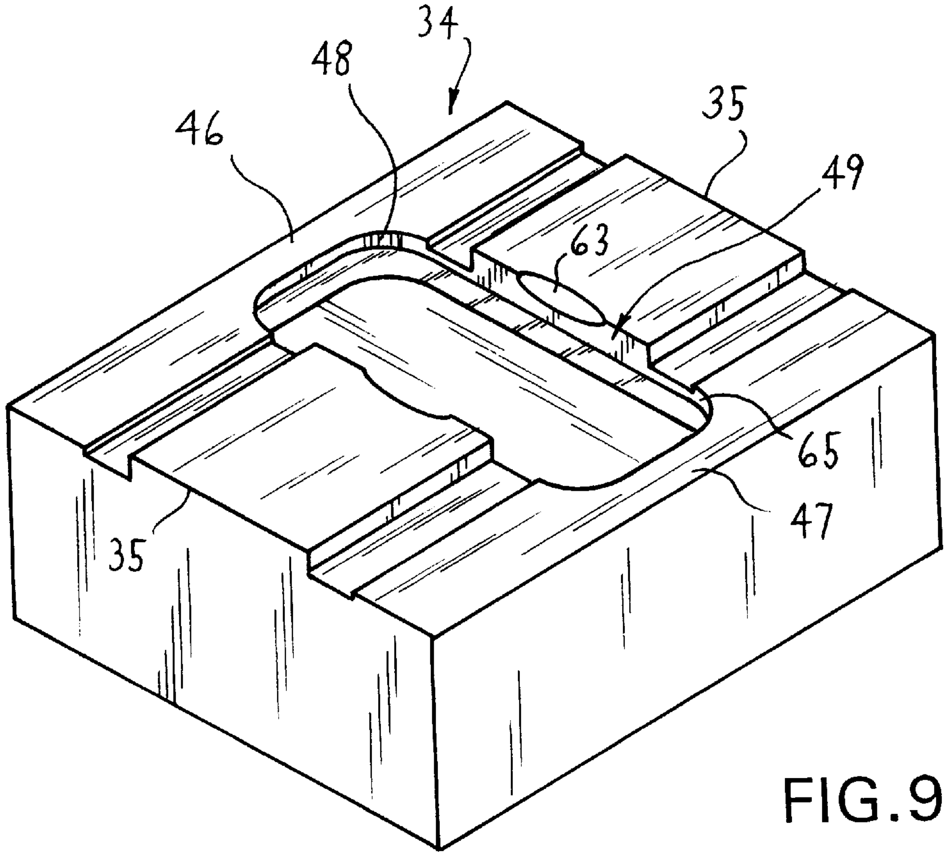
FIG. 9 shows an isometric view of a top jaw member having an aperture.
Figure 10:
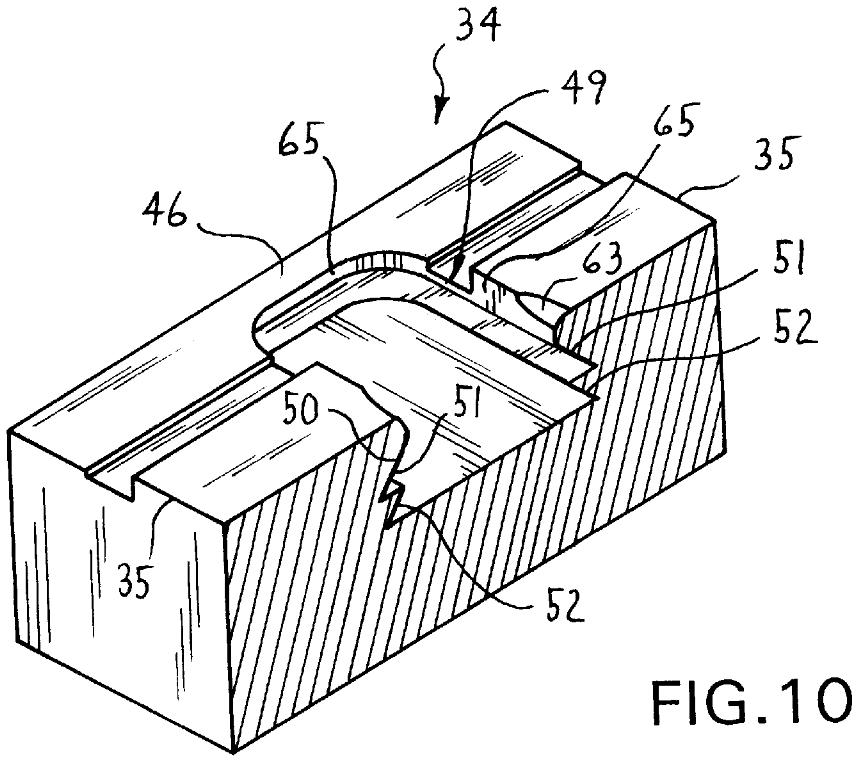
FIG. 10 shows a cross-section taken at 10—10 of FIG. 9 better illustrating first and second dovetail sections.

FIGS. 9 and 10 each represent an isometric view of a jaw member 34 usable as part of the jaw assemblies 14, 16 of the invention. In this view, keypart 35 of top jaw member 34 that coacts with base member 12 to prevent transverse movement of the jaw member when positioned on workholding device 10 is clearly shown.

The actual shape of notch elements 63 is better illustrated in FIG. 9. Other shapes, such as a flat incline can also be utilized for notch elements 63. Notch elements 63 assist in positioning keeper element 62 into dovetail sections 51, 52. However, notch elements 63 can be optional in some embodiments of the invention.

First and second dovetail sections 51, 52 are illustrated in FIG. 10. As described earlier, these sections can align with dovetail portions 55, 56 of master jaw element 36 for securement to workholding device 11.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A moving jaw assembly for a workholding apparatus comprising:

a master jaw element which is movably slidably supported on a base member of the workholding apparatus, said master jaw element having a first keypart fixed thereto and projecting upwardly, said first keypart having a dovetail-shaped cross section on at least one side corresponding to an inward facing side of the workholding apparatus;

a top jaw member removably mounted on said master jaw element, said top jaw member defining at least one workpiece-gripping surface thereon, said top jaw member including a pair of flat and coplanar bottom surfaces disposed adjacent opposite ends of said top jaw member and separated by an elongate second keypart which is disposed between said bottom surfaces and projects downwardly therefrom, said top jaw member having a connecting passage formed in and extending transversely through at least a portion of said top jaw member from one end to the other end thereof in perpendicular relation to said elongate second keypart of said top jaw member, said connecting passage having a dovetail-shaped cross-section which converges to a mouth, the dovetail-shaped cross-section corresponding to, but being slightly larger than said first dovetail-shaped cross section of said master jaw element, the connecting passage being closed on both ends to form an aperture having the dovetail-shaped cross-section such that, during set up of said jaw assembly, said top jaw member is placed over said keypart of said master jaw element and secured thereto; and a takeup member movably mounted on said first keypart and urged outwardly for engagement with one inclined side surface of said aperture for eliminating clearance adjacent the inclined side surface of said aperture and for causing said top jaw member to snug down against said base member and said master jaw element, wherein the end of said takeup member contacting the side surface of said aperture comprises an arcuate keeper element, the side surface of said aperture including a notch to enable the arcuate keeper element to reach a secured position with less resistance.

2. The jaw assembly according to claim 1, wherein said takeup member extends upwardly into contact with the side surface of said aperture at an upward angle from about 5 degrees to about 45 degrees from horizontal.

3. The jaw assembly according to claim 1, wherein the keeper element comprises a plunger biased outwardly by a spring.

4. The jaw assembly according to claim 1, wherein said first keypart has a gap of no more than about 0.020 inch with respect to said aperture of said top jaw member at least at an outside facing surface of said master jaw element in a direction perpendicular to the length of said jaw assembly during and after placement thereon, the gap thus being sized to prevent turnings or metal chips from entering said top jaw member through the gap and interfering with operation of said jaw assembly.

5. The jaw assembly according to claim 1, wherein the dovetail-shaped cross section of said first keypart includes a second dovetail-shaped cross section above the first dovetail-shaped cross section and the dovetail-shaped cross section of said aperture includes a corresponding second dovetail-shaped cross section, the two dovetail-shaped cross sections of said aperture having substantially the same surface area as an aperture having a single dovetail-shaped cross section for an equivalent aperture depth.

6. The jaw assembly according to claim 1, wherein closing the ends of said passage to form said aperture decreases deformation or bending of said top jaw member due to load forces on the workpiece-gripping surface as compared to top jaws having an open passage on at least one end.

7. A moving jaw assembly for a workholding apparatus comprising:

a master jaw element which is movably slidably supported on a base member of the workholding apparatus, said master jaw element having a first keypart fixed thereto and projecting upwardly, said first keypart having a cross section including first and second dovetail-shaped portions on a side corresponding to the inward facing side of the workholding apparatus, the first dovetail-shaped portion being below the second dovetail-shaped portion;

a top jaw member removably mounted on said master jaw element, said top jaw member defining at least one workpiece-gripping surface thereon, said top jaw member including a pair of flat and coplanar bottom surfaces disposed adjacent opposite ends of said top jaw member and separated by an elongate second keypart which is disposed between said bottom surfaces and projects downwardly therefrom, said top jaw member having a connecting passage formed in and extending transversely through at least a portion of said top jaw member from one end to an other end thereof in perpendicular relation to said elongate second keypart of said top jaw member, the connecting passage having a cross section including first and second dovetail-shaped sections, the first dovetail-shaped section being spaced below the second dovetail-shaped section, the first and second dovetail-shaped sections of the connecting passage corresponding to, but being slightly larger than the first and second dovetail-shaped portions of said master jaw element.

8. The jaw assembly as in claim 7, the first and second dovetail-shaped sections having substantially the same contact surface area with the dovetail-shaped portions as a keypart having a single dovetail-shaped cross section with the same depth.

9. The jaw assembly according to claim 7, wherein the connecting passage is closed on both ends to form an aperture, and the jaw assembly includes a takeup member movably mounted on said first keypart and urged outwardly for engagement with one inclined side surface of said aperture for eliminating clearance adjacent an inclined side surface of said aperture and for causing said top jaw member to snug down against said base member and said master jaw element.

10. The jaw assembly according to claim 9, wherein said takeup member extends upwardly into contact with the side surface of said aperture at an upward angle from about 5 degrees to about 45 degrees from horizontal.

11. The jaw assembly according to claim 9, wherein the end of said takeup member contacting the side surface of said aperture comprises an arcuate keeper element.

12. A moving jaw assembly for a workholding apparatus comprising:

a master jaw element which is movably slidably supported on a base member of the workholding apparatus, said master jaw element having a first keypart fixed thereto and projecting upwardly, said first keypart having a first dovetail-shaped cross section on at least one side corresponding to an inward facing side of the workholding apparatus, said master jaw element further comprising a takeup member mounted on said first keypart, said takeup member including a keeper element being urged outwardly;

a top jaw member removably mounted on said master jaw element, said top jaw member defining at least one workpiece-gripping surface thereon, said top jaw member including a pair of flat and coplanar bottom surfaces disposed adjacent opposite ends of said top jaw member and separated by an elongate second keypart which is disposed between said bottom surfaces and projects downwardly therefrom, said top jaw member having a connecting passage formed in and extending transversely through at least a portion of said top jaw member from one end to the other end thereof in perpendicular relation to said elongate second keypart of said top jaw member, the connecting passage being closed on both ends to form an aperture having a dovetail-shaped cross-section which converges to a mouth having substantially vertical walls, the dovetail-shaped cross-section of the aperture corresponding to, but being slightly larger than the first dovetail-shaped cross section of said master jaw element, the substantially vertical walls of the mouth opening into an inclined surface forming the beginning of the dovetail-shaped cross-section of the aperture, such that, during set up of said jaw assembly, said top jaw member is placed over said first keypart of said master jaw element and secured thereto by said keeper element of said takeup member, wherein said first keypart has a gap of no more than about 0.020 inch with respect to said aperture of said top jaw member at least at an outside facing surface of said master jaw element in a direction perpendicular to the length of said jaw assembly during and after placement thereon, the gap thus being sized to prevent turnings or metal chips from entering said top jaw member through the gap and interfering with operation of said jaw assembly.

13. The jaw assembly of claim 12, said takeup member being mounted on said first keypart at an upward angle of from about 5 degrees to about 45 degrees from horizontal and said keeper element contacting the inclined surface at a distance of no more than about 0.060 inch from the edge of the vertical walls of the mouth.

14. The jaw assembly of claim 13, wherein the end of said keeper element contacting the inclined side surface has a cylindrical shape, and the end of said keeper element is biased outwardly and into contact with the inclined side surface by a spring.

15. The jaw assembly according to claim 9, wherein the side surface of said aperture includes a notch to enable the takeup member to reach a secured position with less resistance.

16. The jaw assembly according to claim 12, wherein the side surface of said aperture includes a notch to enable the keeper element to reach a secured position with less resistance.

17. The jaw assembly according to claim 1, wherein the arcuate keeper element contacts the inclined surface at a distance of no more than about 0.100 inch from the mouth of the connecting passage, causing said top jaw member to snug down against said base member and said master jaw element.

18. The jaw assembly according to claim 12, wherein the keeper element contacts the inclined surface at a distance of no more than about 0.100 inch from the mouth of the connecting passage, causing said top jaw member to snug down against said base member and said master jaw element.

19. The jaw assembly according to claim 11, wherein the arcuate keeper element contacts the inclined surface at a distance of no more than about 0.100 inch from the mouth of the connecting passage, causing said top jaw member to snug down against said base member and said master jaw element.

* * * * *